United States Patent [19]

Czerwinski

[11] 4,308,365

[45] Dec. 29, 1981

[54] REACTIVE ADHESIVE

[75] Inventor: Richard W. Czerwinski, Eaton, Ohio

[73] Assignee: Whittaker Corporation, Los Angeles, Calif.

[21] Appl. No.: 189,471

[22] Filed: Sep. 22, 1980

[51] Int. Cl.$^3$ ................................................ C08F 8/30
[52] U.S. Cl. ........................... 525/377; 260/29.2 N; 260/29.6 MN; 260/29.6 CM
[58] Field of Search ................. 525/377; 260/29.2 N, 260/29.6 MN, 29.6 CM

[56] References Cited

U.S. PATENT DOCUMENTS

| | | | |
|---|---|---|---|
| 3,804,798 | 4/1974 | Canton | 525/377 |
| 3,859,258 | 1/1975 | Manino | 525/377 |
| 3,949,143 | 4/1976 | Schlesinger | 525/377 |
| 4,068,027 | 1/1978 | Van Ornum | 525/377 |
| 4,091,195 | 5/1978 | Vitek | 525/377 |

*Primary Examiner*—William F. Hamrock
*Attorney, Agent, or Firm*—Donald E. Nist

[57] ABSTRACT

An improved reactive adhesive for bonding rubber to rubber or rubber to other substrates such as metal or plastic, comprises an effective mixture of (a) an ionomer resin comprising a copolymer of ethylene, vinyl or polyoxymethylene monomer with a pendant carboxylic acid-containing compound, and (b) a poly-C-nitroso compound. The ionomer resin may be one which has been metal-or quaternary ammonium-neutralized and may be dispersed in water or the like, along with the poly-C-nitroso compound. Preferably, the poly-C-nitroso compound comprises para-dinitrosobenzene. The ionomer may, for example, comprise a polyethylene-methacrylic acid copolymer which has been neutralized with sodium, zinc, or the like. Preferably, the poly-C-nitroso compound is present in a concentration of at least about 15 parts per 100 parts by weight of said ionomer and, most preferably, between about 35 and about 80 parts per 100 parts by weight of said ionomer resin. The adhesive forms a tenacious bond with the poly-C-nitroso compound acting as a bifunctional cross-linking agent. Interchain bonding by predominantly ionomeric linkages produces environmental resistance, weather resistance, ultraviolet and chemical resistance and thermal resistance in the bonded reacted adhesive.

7 Claims, No Drawings

REACTIVE ADHESIVE

BACKGROUND OF THE INVENTION

1. Field of the Invention

The present invention generally relates to adhesives, and more particularly to a novel reactive adhesive particularly for use in bonding rubber to rubber, metal, fabric, plastic or the like.

2. Prior Art

The usual types of adhesive compositions which are employed for linking rubber to rubber, metal and other substrates contain a substantial number of components and are not capable of being applied in a number of ways. Moreover, most of such compositions having varying deficiencies relating to their bonding strength when subjected to chemical, environmental, radiation and other degradation factors. Many of such adhesives are known to corrode certain substrates with which they could otherwise be used. Most such adhesives are subject to attack by most acids and/or alkalies and certain of such adhesives have high moisture admission rates which allow the substrate itself to be attacked in high humidity conditions. Furthermore, certain conventional adhesives are adapted for use only with either polar or non-polar species of natural and/or synthetic elastomeric compounds.

There is a need for an improved adhesive for use with natural and synthetic elastomers of both the polar and non-polar types, which adhesive preferably should have the ability to be applied by a number of techniques including in the form of aqueous dispersions, by hot melting, by dry powder technology and the like. The compounds should be as simple and as effective as possible, having optimal bonding characteristics whether applied to bond rubber to rubber or to bond rubber to other substrates. Such compounds should be capable of resisting all forms of degradation and of protecting the substrates to which they are attached against degradation including environmental attack.

SUMMARY OF THE INVENTION

The improved reactive adhesive of the present invention satisfies all of the foregoing needs. The adhesive is substantially as set forth in the Abstract above. Thus, it comprises an effective mixture of an ionomer resin comprising a copolymer of ethylene, vinyl or polyoxymethylene monomer with a pendant carboxylic acid-containing compound, the monomer having been reacted with and thus containing a metal-bearing portion. The metal preferably is sodium or zinc but can be any other suitable metal. The poly-C-nitroso compound preferably comprises para-dinitrosobenzene in a concentration, by weight, in the adhesive of about 15-80 parts per 100 parts of the ionomer resin. In any event, the poly-C-nitroso compound is present in a concentration at least sufficient to chemically cross-link the ionomer into a solid dense mass. The ionomer may be present as a dispersion in water, or the like. The adhesive can also be applied in the form of a melted powder composition or the like.

Thus, this adhesive bonding composition employs only two components, namely, a selected ionomer resin and a poly C-nitroso compound, in the mixture to achieve a bond of an elastomeric compound to metals, plastics, fiber, or other elastomeric polymers, during vulcanization of the same or after vulcanization. After drying of the vehicle in which the mixture is dispersed, the ionomer resin and poly-C-nitroso curative mixture coalesces and the ionomer resin functions as the curative binder and primary film former, and simultaneously forms the primary interface with the substrate to which the composition has been applied. In the case of oxidizable metals, this film protects the same from corrosive elements and forces, yet this protective barrier has not been cross-linked as thought of in the general sense. Prior art compositions performing adhesive bonding must be thermally cross-linked to achieve the environmental resistance required in the primary film. The ionomeric composition possesses the ionic linkages within the intermolecular structure thus formed, which structure has the characteristic of resisting environmental attack without subjecting it first to a thermal cycle. This is attributed to the intrinsic secondary forces between polymer chains in the linkages commonly referred to as ionomeric linkages. The interchain/ionomeric structure alone will resist attack by most acids or alkali. Also of prime importance are the low moisture vapor transmission properties and inertness generally associated with ionomers. This ionomer resin poly-C-nitroso composition can be processed in the normal manner, utilizing the vulcanization cycle of the interfacing elastomer compound to further crosslink the structure and maximize its film properties.

The exterior surface of the film will undergo a slight melt at approximately 150°-170° F. under pressure, and then form a secondary interface with the elastomer compound during vulcanization. The composition in the slightly molten state will effectively "wet" the compound during interfacial formation. The unique positive and negatively charged groups, unassociated with each other in the ionomer, dictate that the polar character of the elastomeric compound being bonded is of little significance in the terms of bondability. The pendant ionomeric linkages are essentially polar in nature, which produces compatibility with polar compounds. The ethylene backbone in the ionomer produces the compatibility in non-polar compound species. This ionomer resin poly-C-nitroso composition will effectively "bond" polar as well as the non-polar species of natural and/or synthetic elastomeric compounds to a wide range of substrates due to the inherent segregated polar character. The basic affinity of the resin for diverse substrates is also a function of its ionized pendant groups.

In addition to the utilization of this type of adhesive system, cast as a fluid dispersion onto the substrate from a fluid vehicle and coalesced into a film, it may also be applied as a continuous hot melt coating, or applied as a discontinuous powder coating and subsequently fused together by heat. The solventless or solid state application of this material utilizes the relatively low melting point of the ionomers to achieve a temporary fluid or molten state, forming the continuous phase onto the substrate, which is then cooled to below the melting point of the bonding composition to solidify it. A resinous, low melting point epoxy may also be utilized as a fluxing agent for the ionomer resin poly-C-nitroso powder, promoting uniform flow at fusion temperature in the 100° C. range. Fluidized bed or electrostatic powder equipment can be used for application of this bonding composition. The powder or solid state of the adhesive does not change the adhesive's ability to bond polar or non-polar elastomeric compounds to substrates coated with it. Further details of the invention are set forth in the following detailed description.

DETAILED DESCRIPTION

The ionomer resin utilized in the bonding composition of the present invention may be defined as copolymers of ethylene, vinyl, or polyoxymethylene monomers with a pendant carboxylic acid group, such as methacrylic or acrylic acid, in which these groups have been ionized or neutralized partially or fully with metals, such as sodium, zinc, potassium, or lithium, quaternary ammonium ions etc., as examples. These ionomers may vary with the chemical composition of the backbone polymer chain, the moiety and type of pendant carboxylic acid groups, and the percentage and type of metal ion.

A preferred species of ionomer resin used in the present composition is Na- and Zn-ion-linked modified ethylene/methacrylic acid inter-polymer in an aqueous dispersion. This is utilized as the primary component of the composition, performing the functions of ionomer resin binder and primary film former in an aqueous coating composition. It can also be used in the solid state, in combination with a poly-C-nitroso compound in hot melt primer or powder adhesive applications. It can form an environmentally protective boundary layer of film, which upon further reaction, such as during vulcanization, becomes a permanent composite attaching the substrate and the elastomer being bonded.

The second and equally important component of the present composition is a poly-C-nitroso compound. The poly-C-nitroso compound may be an aromatic such as benzene, naphthalene, biphenyl, anthracene, etc., with at least two nitroso groups (—NO) attached directly to non-adjacent ring carbon atoms. The preferred species is para-dinitrosobenzene represented by the formula:

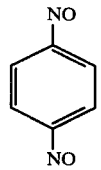

Para-dinitrosobenzene usually exists in polymeric form. The primary function of the dinitrosobenzene (PDNB) is to chemically crosslink the ionomer resin into a fused, solid, dense mass which renders the composite permanently immobile, analogous to vulcanization. The physical properties of the ionomer resin are greatly improved through the novel method of crosslinking utilizing PDNB or its equivalents. Properties of the ionomer resin-PDNB composition are produced by the dissociation of p-dinitrosobenzene existing as a polymer or dimer and its reaction with the α-hydrogen, and/or allylic hydrogen in the ionomeric backbone chain. The secondary function of the PDNB is to interdiffuse into the elastomeric substrate during the vulcanization process, forming strong crosslinks with available functional groups or molecules in the substrate's elastomer (cross-bridging), or other functional compounding ingredients. This interdiffusion into the elastomer is believed to be by molecular dissociation, then vaporization or sublimation of the p-dinitrosobenzene molecules above 140°–160° C., into a saturated or unsaturated polymeric chain of the elastomer being vulcanized or cured.

The incorporation of p-dinitrosobenzene into the present coating composition is made by simple addition of the preformed PDNB to the ionomer resin, or by in-situ formation of the PDNB by, for example, oxidation of p-quinone dioxime in equimolar ratios through an oxidizing agent. This reaction is illustrated as follows:

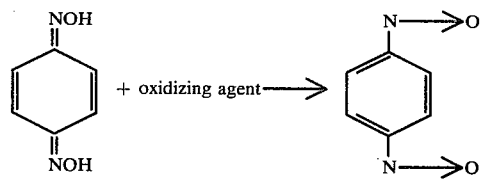

In the testing and development of this invention, many additional resins, curatives, and accelerators, normally used in the compounding formulation of adhesive compositions, were similarly evaluated at various ratios to the ionomer resin solids. Only the ionomer resin and the poly-C-nitroso compound have produced satisfactory adhesion, demonstrating the unique reactivity of the present composition.

The following Example I describes and exemplifies the use of p-dinitrosobenzene with a polyethylene/methacrylic acid ionomer resin as a coating composition for a polar elastomeric compound of the styrene butadiene copolymer (SBR) type, and an isobutylene/isoprene copolymer (IRR or butyl) of the non-polar species, in each case interfaced and vulcanized to grit blasted and degreased mild steel substrate in the form of what is commonly called a "button" assembly.

The ionomer resin used in Example I was of the type disclosed in U.S. Pat. No. 3,264,272. It was identified as 56220 Surlyn 2 Ionomer Dispersion, was a polyethylene-methacrylic acid and had the characteristics set forth in Table I below:

TABLE I

| 56220 SURLYN ® 2 IONOMER DISPERSION | |
|---|---|
| (SURLYN is a registered trademark of E. I. DUPONT DE NEMOURS & CO.) | |
| % SOLIDS BY WEIGHT | 31.0 ± 1% |
| % SOLIDS BY VOLUME | 31.8 ± 1% |
| WEIGHT PER GALLON | 8.22 ± 0.1 LBS. |
| VISCOSITY (RVT BROOKFIELD, #3 SPINDLE, 20 RPM) | 500–2000 CPS |
| pH | 9.8–10.3 |
| PARTICLE SIZE | 0.02–0.08 MICRONS |
| APPEARANCE WET | WHITE, MILKY, CREAMY EMULSION |
| APPEARANCE DRY | COLORLESS FILM |
| INTERNAL SOLVENT | WATER |
| REDUCTION SOLVENT | DISTILLED OR DEIONIZED WATER OR WATER/ALCOHOL BLENDS. |
| FLAMMABILITY | NON-FLAMMABLE |

TABLE I-continued

56220 SURLYN ® 2 IONOMER DISPERSION
(SURLYN is a registered trademark of E. I. DUPONT DE NEMOURS & CO.)

| | |
|---|---|
| BLOCK RESISTANCE (½ PSIG FOR 2 HOURS) | COATED/COATED VERY SLIGHT TICK @ 150° F. |
| | COATED/UNCOATED NO CLING @ 160° F. |
| (150 PSIG FOR 8 HOURS) | COATED/COATED NO BLOCKING @ 110° F. |
| | COATED/UNCOATED NO BLOCKING @ 120° F. |
| STORAGE STABILITY | 6 MONTHS MINIMUM |
| POT LIFE | INDEFINITE IF NOT FROZEN, CONTAMINATED IF ALLOWED TO DRY. |
| SEALING RANGE: (½ SEC. DWELL, 40 PSIG ON SENTINAL SEALER) | MINIMUM SUGGESTED INTERFACE TEMPERATURE 200° F. (COATED/COATED) AND 250° F. (COATED/UNCOATED) |
| MINIMUM HEAT SEAL TEMPERATURE | 170° F. |
| HOT TACK | 4 OZ/IN.   44 G/CM* |
| COEFFICIENT OF FRICTION (UNMODIFIED) | 0.30 MIN. |
| FREEZE-THAW STABILITY | NO STABILITY |
| SHIPPING CLASSIFICATION | NON CORROSIVE/NON HAZARDOUS |

*MINIMUM VALUE TAPPI T683 SPRING TEST. MAXIMUM HOT TACK AT LOWER END OF SEALING RANGE.

The Manufacturing Procedure used for the Examples was as follows:

1. Deionized water was placed in a clean container in an amount of about 50 parts by weight.
2. While agitating, p-dinitrosobenzene (as a 40-50% non-volatile product in $H_2O$, which is essentially a heavy thixotrope) was added to the water in an amount varying to provide the relative proportions set forth in the following examples.
3. Clean, mild steel ball milling shot was added to the container in a volume approximately ½ that of the PDNB and water mixture. This admixture was "milled" on a can roller for 30 minutes to reduce the overall particle size of the PDNB to approximately 10-20 microns.
4. Then, the ionomer resin at 50-55% non-volatile solids, in an aqueous dispersion, was mixed with the "milled" dinitrosobenzene/$H_2O$ slurry under agitation in the amount of about 50 parts by weight or proportions set forth in the examples. This final mixture was then homogenized for 10-15 minutes additionally before separation from the shot balls.
5. The non-volatile solids percentage of the final product was adjusted to about 25-30% with additional $H_2O$ under agitation. The pH of the finished product fell within the 9-10 pH range at 23° C.
6. All samples of coating compositions were brush applied to the substrates, and immediately force dried at 49° C. for 5 minutes minimum, vulcanized in a transfer mold for 20 minutes at 160° C., and allowed to cool to ambient temperatures, 25° C., before testing on the Instron tester, per test No. ASTM D429-73A.

TABLE II

| Ionomer (parts by weight) | 100 | 100 | 100 | 100 | 100 | 100 | 100 | 100 |
|---|---|---|---|---|---|---|---|---|
| p-dinitrosobenzene (parts by weight) | 0 | 3.0 | 15.0 | 31.0 | 43.0 | 55.0 | 67.0 | 80.0 |
| IIR %R (kg.) | 0(65) | 3(20) | 35(173) | 73(200) | 80(170) | 78(225) | 95(300) | 100(300) |
| SBR %R (kg.) | 0(57) | 5(40) | 20(130) | 50(310) | 92(405) | 85(250) | 75(290) | 65(260) |

The adhesion values for each sample are given as two independent figures. First is the percentage R failure, or failure in the elastomeric compound; the second figure represents the particular tensile pull value at maximum load or stress, at the moment of disruption, at the elastomer/adhesive, or substrate interface, given in kilograms.

As demonstrated in the adhesion values obtained, significant improvements were obtained when the level of p-dinitrosobenzene was at least about 15 parts (by weight) per hundred parts by weight of the ionomer resin. Adhesion of the coating composition to the IIR compound continued along a continuous curve, increasing the R percentage and tensile values, albeit the tensile figures are not exactly consistent, as the concentration of the PDNB increased. The highest level of PDNB evaluated yielded the highest overall adhesion values. Levels above 80 parts of PDNB per 100 parts of the ionomer resin were excluded because of the questionable physical stability of the product. Thus, it has been observed that the PDNB particles have a tendency to absorb water, they being hydrophillic. This resulted in a thixotropic or pseudo-plastic structure. It appears that the PDNB is also "stealing" or attracting available surfactants from the ionomer dispersion due to the high attractive surface area energy of the PDNB. This structure is suspected as being an aggregation of PDNB particles weakly linked to the ionomer resin particle, and easily broken by shear forces. As the level of PDNB goes up beyond the 80 parts/100 parts of resin level, this aggregation is difficult to break, and the film qualities are unsatisfactory due to the lack of available ionomeric binder/film former.

The adhesion values obtained when SBR rubber was the substrate (along with metal) do not show the same rate of increase, in terms of %R failure, as when the IIR compound was used. The peak level of PDNB-vs-optimum R value was close to the 43 parts PDNB/100 parts of ionomer resin level, then sloped off gradually, but definitely showing a decline in R values with increasing concentrations of PDNB. This may be the effect of overcure at the elastomer/adhesive interface in the polar SBR compound, or lamination phenomena.

Based upon the above conclusion, it is calculated that the optimum level of PDNB to ionomer resin solids (Phr=parts/hundred parts by weight) lies between 43 and 55 Phr. for polar or non-polar compounds, as discussed herein. Effective levels of PDNB can be as low as 1.0 Phr.

It can therefore be demonstrated that the use of C-nitroso compounds in conjunction, or in admixtures thereof, with an ionomeric resin, such as the ionomer of polyethylene, will produce an elastomer adhering bond (polar or non-polar compounds) greater than the tensile strength of the bond between the compounded elastomer alone and a metallic or other substrate.

EXAMPLE II

A zinc/sulfur neutralized, sulfonated ethylene propylene terpolymer (EPDM) ionomer resin was tested. The resin had been sulfonated about 0.2 to 20 mole percent (sulfonate groups), combined with counterions of aluminum, antimony, lead and mixtures of same and neutralized with a basic material selected from the group consisting of the above counterions in their oxide, hydroxide and lower alkanoate form. Such resins are described in the following U.S. Patents, assigned to Exxon Research and Engineering:

U.S. Pat. No. 3,642,728 February 1972
U.S. Pat. No. 3,847,854 November 1974
U.S. Pat. No. 3,974,240 August 1976
U.S. Pat. No. 3,974,241 August 1976
U.S. Pat. No. 4,151,137 April 1979

Sample A

The following formulation was prepared containing the described ionomer resin and poly-C-nitroso compound:

TABLE III

| | | Parts by Weight |
|---|---|---|
| Sulfonated EPDM (Zn) ionomer resin | | 10.0 |
| PDNB | | 4.0 |
| Vehicle | (3.7 parts ethanol) | 86.0 |
| | (9.8 parts toluene) | |
| | (72.5 parts xylene) | |

Manufacturing Procedure for Sample A

1. The sulfonated EPDM ionomer resin was dissolved in the vehicle.
2. In a separate container the p-dinitrosobenzene was ball milled in a portion of the vehicle for one hour with steel shot to reduce the overall particle size to approximately 10–20 microns.
3. The sulfonated EPDM ionomer resin vehicle solution was added to the p-dinitrosobenzene slurry, under agitation, until the mixture was homogeneous.

Sample B

In order to demonstrate the value and uniqueness of the ionomer resin used in Sample A in combination with a poly-C-nitroso compound, an ethylene acrylic acid (20 mol%) co-polymer (EAA) was formulated with poly-C-nitroso and compared to the ionomer resin/poly-C-nitroso mixture. The following formulation was prepared:

TABLE IV

| | Parts by Weight |
|---|---|
| Ethylene Acrylic Acid (co-polymer) (20 mol % acid) | 10.0 |
| p-Dinitrosobenzene | 4.0 |

TABLE IV-continued

| | Parts by Weight |
|---|---|
| Vehicle (Toluene) | 86.0 |

The manufacturing procedure for Sample B was the same as for Sample A.

Application Procedures

1. Mild steel bars were gritblasted and vapor degreased.
2. A suitable primer (THIXON P7, a chlorinated rubber primer) was brush applied to the bars and dried at ambient temperature (26° C.). THIXON is a registered trademark of Whittaker Corporation.
3. In parallel tests Sample A and Sample B formulations were brush applied to the primed bars and dried.
4. An isoprene - isobutylene (IIR) compound and a styrene-butadiene (SBR) compound were separately freshened on a rubber mill. Cut strips of these rubbers were then placed on top of the adhesive coated substrates in a preheated compression mold. The rubber-metal assemblies were then vulcanized under both heat and pressure for 20 minutes at 160° C., then allowed to cool to ambient temperature.

Adhesion Testing

The strength of adhesion of the rubber compound to the metal was determined in accordance with ASTM D-429-73 Method B. Method B specifies that the rubber part is to be bonded onto a metal plate and the rubber part is to be pulled from the metal at a ninety degree angle on a tensile testing machine with a jaw separation rate of 5.08 centimeters per minute. All testing was performed in a controlled environment temperature of approximately 26° C.

TABLE V

| Results | Sample A | Sample B |
|---|---|---|
| IIR %R (kg) | 93 (77) | 0 (no resistance) |
| SBR %R (kg) | 35 (88) | 0 (no resistance) |

Conclusions

As demonstrated by the adhesion test values on both compounds, the ionomer resin/poly-C-nitroso composition produced failure in the rubber of both the polar and non-polar rubber types. The ethylene acrylic acid co-polymer (non-ionomer)/poly-C-nitroso composition yielded only cohesive failure in the adhesive and no resistance. These assemblies fell apart upon demolding, with cohesive failure in the film, which indicated the film had little if any crosslinking of the EAA by the poly-C-nitroso compound. Accordingly, the adhesive coating composition of the present invention provides substantially improved results.

The ionomer resin/poly-C-nitroso composition of the present invention when used in an aqueous system may contain various ingredients that improve the physical properties or stability of the "wet" formulation and/or the solid adhesive film. These ingredients may include surfactants, dispersants, wetting agents, thickeners, anti-settling agents, antifloating agents, antiflooding agents, stabilizers, antioxidants, ultra-violet absorbers, protective colloids, leveling or coalescing agents, antimicrobial agents, and antilivering agents, all as are known in the art for use with conventional adhesives of the rubber-to-metal bonding types. Pigments can be used in the present composition, primarily for hiding power and color identification.

The ionomers specified herein can be used singly or in mixtures with or without other selected polymers. This is illustrated by the following information that shows that various solid polyethylene-methacrylic acid resins can be combined with chlorosulfonated polyethylene materials and the like and still utilized to formulate successful adhesives. Thus, the ionomers called for herein have been milled into chlorosulfonated polyethylene and other rubber polymers having an aliphatic backbone. The selected ionomer powders so milled were dissolved or were finely dispersed into the rubber polymer, enabling the total ionomeric resin/rubber blend to go into solution in common organic solvents such as toluene, although ionomeric resins such as polyethylene-methacrylic acid copolymers by themselves do not dissolve in organic solvents because of their ionic nature.

By blending together the ionomeric resins with rubber polymer having an aliphatic backbone, metal-adhering properties can be imparted to the rubber adhesive system without destroying the ability of the adhesive to bond polar or non-polar types of elastomers. The ionomeric resin-linear polymer blends so produced can be converted to latex type materials by first dissolving them in organic solvents, then emulsifying them in water and thereafter removing the organic solvents.

In the specific example set forth below, Surlyn powders comprising ethylene-methacrylic acid copolymer were cryogenically ground to mesh sizes −35 (Sample A), −35 (Sample B) and −12 (Sample C), U.S. standard mesh. The ground powder in each case was then milled into chlorosulfonated polyethylene using a two roll rubber mill at temperatures below 200° F.

Table VI below sets out various formulations for the ionomeric resin/rubber blend utilized. Table VII below sets out the basic formulation for an adhesive made from each of the rubber-resin blends specified in Table VI. Table VIII below sets out the results of testing the adhesives provided through the use of Samples A through I of Table VI in the recipe of Table VII when bonded to EPDM rubber stock and cured for 30 minutes at 320° F.

TABLE VI

| Resin/Rubber Blend | A | B | C | D | E | F | G | H | I |
|---|---|---|---|---|---|---|---|---|---|
| Chlorosulfonated Rubber (%) (Hypalon 40) | 80 | 70 | 60 | 80 | 70 | 60 | 80 | 70 | 60 |
| Polyethylene-Methacrylic Acid Resin | | | | | | | | | |
| (%) (Surlyn AD 8231) | 20 | 30 | 40 | | | | | | |
| (%) (Surlyn 1703) | | | | 20 | 30 | 40 | | | |
| (%) (Surlyn 1855) | | | | | | | 20 | 30 | 40 |

TABLE VII

| Adhesive Recipe | |
|---|---|
| Rubber/Resin Blend | 100 |
| Paradinitrosobenzene | 40 |
| Carbon Black | 40 |
| Solvent (Toluene) | 900 |
| Mixing Procedure | Dissolve polymer/resin blend in toluene, add carbon black and DNB and grind in ball mill for two hours. Apply adhesive to grit blasted cold rolled steel and dry. (Test method ASTM - D429-73B). |

TABLE VIII

Data on EPDM rubber stock - cure - 30 minutes at 320° F.

| Recipe | A | B | C | D | E | F | G | H | I |
|---|---|---|---|---|---|---|---|---|---|
| Metal Adhesion (%) | 80 | 40 | 10 | 90 | 60 | 5 | 95 | 60 | 5 |
| Rubber Adhesion (%) | 20 | 60 | 90 | 10 | 40 | 95 | 5 | 40 | 95 |

TABLE IX

Data on natural rubber stock - cure - 20 minutes at 320° F.

| Recipe | A | B | C | D | E | F | G | H | I |
|---|---|---|---|---|---|---|---|---|---|
| Metal Adhesion (%) | 40 | 20 | 0 | 40 | 15 | 5 | 35 | 15 | 5 |
| Rubber Adhesion (%) | 60 | 80 | 100 | 60 | 85 | 95 | 65 | 85 | 95 |

NOTE
Metal Adhesion = % of metal showing after rubber is pulled at 90° peel.
Rubber Adhesion = % of tear within bonded rubber after testing at 90° peel.

Table IX provides the results obtained when the same tests are run utilizing natural rubber stock and a curing time at 320° F. The Tables VIII and IX illustrate that significant rubber to metal adhesion is obtained with most of the formulations of Table VI employing the blend of chlorosulfonated rubber and the particular ionomeric resins employed in these tests. That addition of the ionomeric resin to the chlorosulfonated rubber increased the metal adhering properties of the adhesive without loss of adhesion to the rubber.

Various other modifications, changes, alterations and additions can be made in the present composition, its components and their parameters. All such modifications, changes, alterations and additions as are within the scope of the appended claims form part of the present invention.

What is claimed is:

1. An improved aqueous dispersion reactive adhesive for bonding rubber to rubber and other substrates, said adhesive comprising;
   a. an ionomer resin comprising an ionized copolymer of ethylene, vinyl or polyoxymethylene monomer with a pendant carboxylic acid-containing compound; and,
   b. para-dinitrosobenzene.

2. The improved adhesive of claim 1 wherein said adhesive includes a dispersant.

3. The improved adhesive of claim 1 wherein said ionomer comprises metal or quaternary ammonium-neutralized polyethylene-methacrylic acid copolymer.

4. The improved adhesive of claim 1 wherein said ionomer comprises zinc-sulfur neutralized, sulfonated ethylene propylene terpolymer.

5. The improved adhesive of claim 1 wherein said poly-C-nitroso compound is present in a concentration by weight of at least 15 parts per 100 parts of said ionomer.

6. The improved adhesive of claim 5 wherein said poly-C-nitroso compound comprises para-dinitrosobenzene in a concentration by weight of between about 35 and about 80 parts per 100 parts of said ionomer.

7. The improved adhesive of claim 6 wherein said ionomer comprises ethylene/methacrylic acid copolymer in an aqueous dispersion, said copolymer having been neutralized with at least one of sodium and zinc.

* * * * *